United States Patent

[11] 3,570,724

| [72] | Inventors | Freerk J. Fontein<br>Heerlen;<br>Martinus Ploeg, Brunssum, Netherlands |
|---|---|---|
| [21] | Appl. No. | 750,417 |
| [22] | Filed | July 8, 1968 |
| [45] | Patented | Mar. 16, 1971 |
| [73] | Assignee | Stamicarbon N.V.<br>Heerlen, Netherlands |
| [32] | Priority | July 7, 1967, June 17, 1968 |
| [33] | | Netherlands |
| [31] | | 6,709,518 and 6,808,518 |

[54] APPARATUS FOR DISCHARGING LIQUID FERTILIZER IN LARGE DROPS
4 Claims, 7 Drawing Figs.

[52] U.S. Cl. .................................................. 222/478, 239/468
[51] Int. Cl. .................................................. B67d 3/00
[50] Field of Search .................................................. 222/488; 239/470; 222/176; 222/330, 478, 420; 239/468, 469

[56] References Cited
UNITED STATES PATENTS

| 847,729 | 3/1907 | Clements et al. | 239/470X |
| 1,702,341 | 2/1929 | Gillespie | 222/330X |
| 2,417,228 | 3/1947 | Yoder | 239/468 |
| 3,117,697 | 1/1964 | Watson | 222/330X |
| 3,139,848 | 7/1964 | Welty | 239/468X |

FOREIGN PATENTS

| 338,791 | 7/1959 | Switzerland | 239/470 |

Primary Examiner—Stanley H. Tollberg
Assistant Examiner—H. S. Lane
Attorney—Cushman, Darby and Cushman ABSTRACT: Apparatus for discharging liquid fertilizer in the form of large drops, includes a catch vessel having in its sectoral channels bottom a plurality of drain openings through which liquid fertilizer delivered thereto from a liquid fertilizer distributor flows under gravity through drip tubes connected to the drain openings onto the ground. The distributor located centrally above the bottom of the catch vessel can be a vortex chamber or a combination of feed pipe and target plate.

INVENTORS
FREERK J. FONTEIN
MARTINUS PLOEG

BY Cushman Darby & Cushman
ATTORNEYS

APPARATUS FOR DISCHARGING LIQUID FERTILIZER IN LARGE DROPS

The invention relates to a machine for applying fertilizer solutions or fertilizer suspensions to the soil. Such a machine normally comprises a liquid reservoir, a distributor connected thereto and a number of distribution points, normally sprayers. Experience with such installations has shown that application of pressure spraying with the conventional type of sprayers, and the consequent formation of a great many of minute droplets, renders the leaves of the crops very liable to scorching. With large drops the scorching hazard is much less severe (these wet a smaller portion of the leaf surface, drop sooner from the leaves onto the ground, and dry up less rapidly). Further, small drops are more susceptible to wind. It is advantageous, therefore, to apply the fertilizer to the soil in the form of large drops.

An object of the invention is to provide a machine by means of which fairly large drops can be distributed evenly over the soil. The machine according to the invention is, therefore, characterized by distributor including a distributing means rotation symmetrically operable on a substantially vertical axis and a catching vessel disposed coaxially under said distributor and made up of equal adjoining sectors, each of which is connected by a conduit to one of the various distribution points.

Good results have been achieved with a distributing means designed as a rotation symmetrical vortex chamber having a tangential feed pipe and a central bottom outlet, with the catching vessel disposed in coaxial relation thereto. A preferred shape of the vortex chamber is that of a conical cyclone with the apex directed upwards and the outlet arrange in the base. The liquid issuing from said outlet is very evenly spread over the sectors of the catching vessel in the form of a conical film, and thence supplied to the distribution points. The machine according to the invention is relatively easy to build, little susceptible to variations in viscosity or pressure and, with blocking hazards being excluded, particularly suited for handling fertilizer suspensions.

A more simple but also reliable machine can be obtained when the distributing means is formed as a rotation symmetrical target plate and a supply pipe coaxially therewith. Preferably the catching vessel is provided with internal longitudinal grooves in its upright wall, corresponding with the sectors in the bottom.

This construction has with respect to the first-mentioned construction the advantage of fewer parts that should be machined precisely. Moreover the viscosity of the solution or suspension to be sprayed affects less the distribution properties and therefore the performance.

The invention will be elucidated with reference to some embodiments shown in the drawings.

Figure 1:
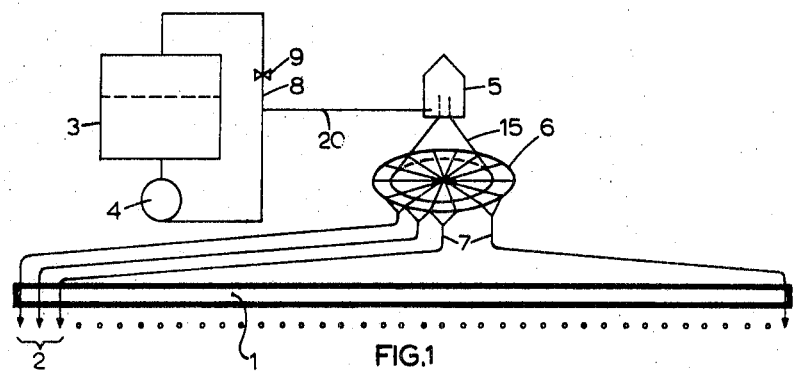
FIG. 1 is a diagrammatic picture of a machine for applying fertilizer solutions or fertilizer suspensions to the soil.

Referring to FIG. 1, 1 denotes a spray boom which, in some way or other, can be moved forward over the soil. For this purpose, boom 1 may be attached, for example, to the lifting mechanism of an agricultural tractor (not shown). Boom 1 may be composed of some detachable, or collapsible parts, each measuring e.g. 2.40 meter in length. Boom 1 is provided with a large number of distribution points 2, say 50, which may be placed e.g. 10 centimeter apart. According to the invention these distribution points consist of drip pipes. Said pipes are directed towards the ground and have a large cross-sectional area (diameter e.g. 15 millimeter). The reservoir for the fertilizer solution or fertilizer suspension is indicated by reference 3. A pump 4 feeds the liquid from reservoir 3 through a line 20 to the distributor, which consists of a rotation symmetrical vortex chamber 5 and a catching vessel 6, which is made up of likewise 50 sectors and is disposed in coaxial relation thereto. Each sector is via a sloped conduit 7 connected to one of the pipes 2. 8 is a bypass line, with controllable valve 9, leading back from the pump to the reservoir 3.

Figure 2:
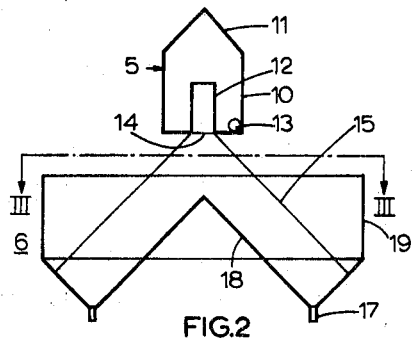
FIG. 2 is an axial longitudinal section taken along the line II–II in FIG. 3.
Figure 3:
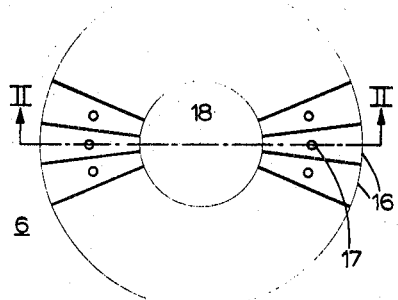
FIG. 3 being a partial top view of catching vessel taken along the line III–III in FIG. 2.

FIGS. 2 and 3 show further details of the distributing means 5. These two figures do not show all sectors of the catching vessel. The rotation symmetrical vortex chamber 5 resembles a conical cyclone, placed upside down, with the outlet arranged in the base. The cylindrical portion of the cyclone is indicated by 10 and the conical part by 11. The vortex chamber is fitted with a so-called overflow tube 12. The outlet of the feed pipe tangentially connected to the vortex chamber is indicated by 13. Catching vessel 6 consists of 50 identical, adjoining sectors 16, each of which has a bottom outlet 17 connecting to the lines 7 in FIG. 1. The liquid leaves outlet 14 in the form of a conical film which is spread in equal portions per unit time over the sectors of vessel 6. The amount distributed per unit time suffices to permit formation of large drops.

Placed in the center of vessel 6 is a cone 18 with the apex directed upwards. This cone serves a dual purpose; minimizing the width of the sectors and ensuring proper distribution of the liquid during starting and stopping of the fertilizer flow. The outer limitation of vessel 6 is constituted by upright wall 19. Said wall 19 serves both as a windscreen and as a splash guard. It may extend up to, or nearly up to vortex chamber 5.

Although said machine described with the help of FIGS. 1—3 has a good performance, this embodiment has some disadvantages. The vortex chamber should be machined rather precisely, whereas moreover the conus angle of said film decreases when the viscosity of the liquid increases.

The modified embodiment depicted in FIGS. 4—7 is improved in this respect.

Figure 4:
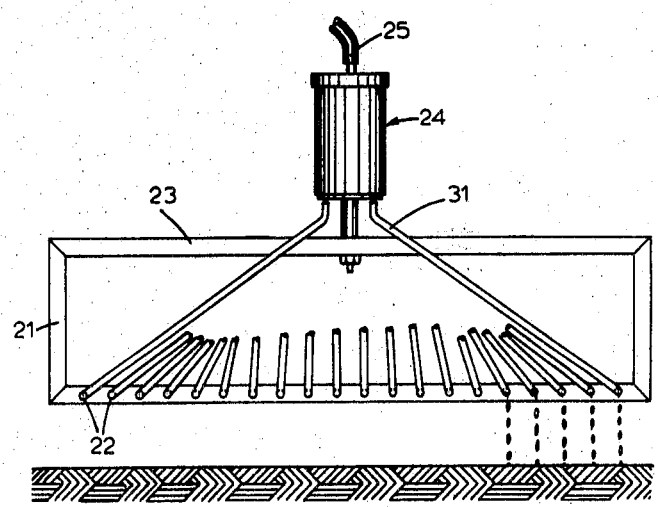
FIG. 4 is a schematic picture of a modified embodiment of a machine for applying fertilizer solutions or fertilizer suspensions to the soil.

Referring to FIG. 4, reference number 21 indicates a spray boom that can be moved parallel to itself over the soil. Boom 21 may to this effect be mounted in the lifting mechanism of an agricultural tractor (not shown). Boom 21 has the shape of a rectangular frame that may be coupled to similar frames at the upright sides in case the effective width is to be enlarged. The boom 21 carries a plurality (in the drawings 20) distribution points indicated with 22 and spaced at for example 10 centimeters. These distribution points consist of drip tubes, from which the formed large drops fall by gravity onto the soil. The pipes have a relatively large cross section area (diameter for example 15 mm.). On the upper long side 23 in the middle thereof a distributor 24 is mounted. The reservoir for the fertilizer solution or fertilizer suspension is deleted from the figure; it may be mounted on the tractor. The liquid is pumped from the reservoir by means of a pump or a compressor through a line 25 to the distributor 24.

The distributor 24 in this embodiment comprises a cylindrical catching vessel 26, a rotation symmetrically plate 27 and a supply pipe 28, coaxially therewith on which the line 25 is connected. Plate 27 is disposed concentrically in the cylinder and perpendicular to the axis thereof. In a short distance from the plate 27 and also coaxial therewith the supply pipe 28 ends. The inner diameter of the pipe 28 is a little smaller than the diameter of the plate 27. The distance from the end to the plate is of the same order of magnitude as said inner diameter. The surface of the target plate 27 opposite to the end of pipe 28 should be smooth and even.

Figure 5:
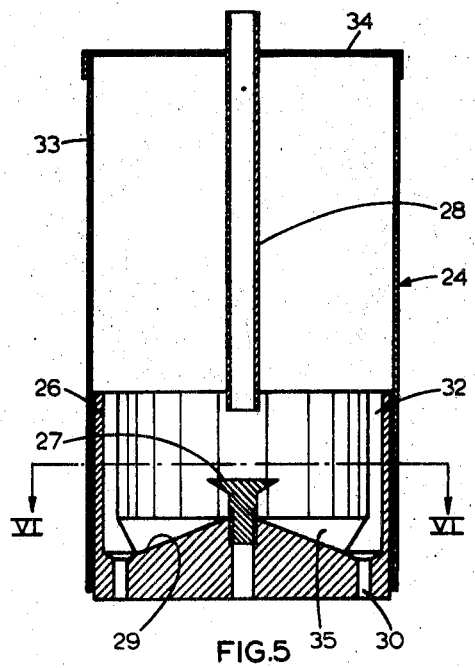
FIG. 5 is an elevational cross section through the distributor.
Figure 6:
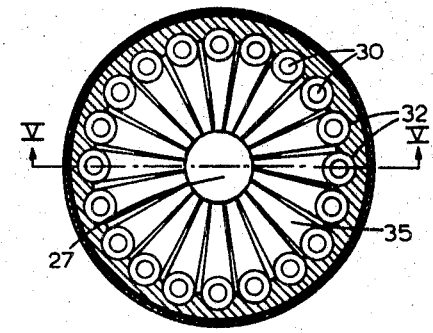
FIG. 6 is a cross section of the distributor over line VI–VI of the FIG. 5.

Distributor 24 is shown in longitudinal section in FIG. 5 and in cross section in FIG. 6. As may be seen therefrom catching vessel 26 has the shape of a cylinder, the bottom 29 of which includes 20 sectors 35 provided with discharge apertures 30. To each of the apertures 30 a hose 31 is connected leading to one of the distribution points 22. At the inner side of the vessel longitudinal grooves 32 are present corresponding to the sectors in the bottom 29. In the sectors 35, bottom 29 of the vessel has substantially the shape of a cone with the apex upright, and the rotation symmetrical target plate 27 on the top. In the embodiment shown the plate is flat and disc-shaped, but it may be either concave or convex.

Around the vessel a cylindrical shield 33 is mounted in an axial sliding way. The supply pipe 28 is carried by this screen 33 by means of a clamp 34. When securing pipe 28 the distance from the end of the pipe 28 to the plate 27 as well as the centering thereof should be attended to. Said distance may, to fix the mind, not be larger than six times the inner diameter of pipe 28.

Figure 7:
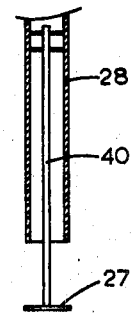
FIG. 7 is a detail of a modification.

As alternative it is possible to secure the plate to the pipe, provided use is made of a rod 40 disposed centrally in the supply pipe 28 in the way as shown in FIG. 7. The rod is secured at a distance upstream from the end of pipe 28 of at least 10 times the inner diameter of pipe 28 to the inner wall thereof.

It has appeared that by means of the machine according to the invention an extremely even distribution of the liquid over the separate discharge pipes (2 respectively 22) can be achieved. The distribution of liquid is nearly independent of the viscosity. All apertures having a large cross section area, blocking hazards are excluded, so that there is no need to place strainers in the delivery pipe.

In comparative tests on grassland, the machine according to the invention proved to cause distinctly less scorch than a conventional sprayer. The machine according to the invention combines noiseless operation with ease of handling and a high capacity.

It will be clear that the invention is not to be restricted to the application to liquid fertilizers but can also be used for distributing other liquids as insecticides and herbicides in the liquid form.

We claim:

1. Apparatus for discharging liquid fertilizer therefrom in the form of relatively large drops comprising a liquid fertilizer distributor means and a liquid fertilizer catch vessel disposed substantially coaxially with said distributor means, said distributor means comprising a vortex chamber, a liquid fertilizer inlet disposed substantially tangentially thereof and a liquid fertilizer outlet disposed axially of said chamber and through which said liquid fertilizer is discharged in the form of a conical film substantially uniformly outwardly from the vertical axis of said catch vessel and into said catch vessel, said catch vessel having a bottom wall comprising a plurality of sectoral channels radially disposed about its vertical axis, each of said sectoral channels provided with a drain opening, means provided with a plurality of liquid fertilizer discharge outlets through which said liquid fertilizer in relatively large drops is discharged under gravity from said apparatus; and a plurality of passages communicating between respective ones of said drain openings and respective ones of said discharge outlets.

2. The apparatus of claim 1 wherein said vortex chamber is of conical shape or includes a conical portion and wherein said axially disposed liquid fertilizer outlet is located at the wider end thereof, said vortex chamber being disposed with its apex directed upwardly.

3. Apparatus for discharging liquid fertilizer therefrom in the form of relatively large drops comprising a liquid fertilizer distributor means and a liquid fertilizer catch vessel disposed substantially coaxially with said distributor means, said distributor means comprising a target plate and a feed pipe coaxial with said catch vessel, the inlet of said feed pipe being in communication with the source of liquid fertilizer, the outlet of said feed pipe being disposed above said target plate onto which said liquid fertilizer is discharged from said feed pipe substantially uniformly outwardly from the vertical axis of said catch vessel and into said catch vessel, said catch vessel having a conical bottom wall, the apex thereof being disposed upwardly, said bottom wall defining the bottom wall of a plurality of downwardly sloping substantially equally dimensioned sectoral channels radially disposed about the vertical axis of said catch vessel, each of said sectoral channels provided with a drain opening in the bottom wall thereof, said catch vessel having a peripheral wall provided with a plurality of internal grooves extending substantially the vertical dimension of said peripheral wall, said grooves extending substantially the vertical dimension of said peripheral wall, said grooves communicating with respective ones of said plurality of sectoral channels for conducting liquid fertilizer to said channels, means provided with a plurality of liquid fertilizer discharge outlets of restricted size through which said liquid fertilizer in relatively large drops is discharged under gravity from said apparatus; and a plurality of passages communicating between respective ones of said drain openings and respective ones of said discharge outlets.

4. The apparatus of claim 3 wherein said catch vessel has a peripheral wall which is axially extensible and which supports said feed pipe.